United States Patent [19]

Castellani

[11] Patent Number: 5,644,105

[45] Date of Patent: Jul. 1, 1997

[54] SELF-EXTINGUISHING CABLE RELEASING LOW QUANTITIES OF TOXIC AND CORROSIVE SMOKES AND GASES, AND PROCESS FOR PRODUCING THE SAME

[75] Inventor: Luca Castellani, Corsico, Italy

[73] Assignee: Pirelli Cavi S.p.A., Milan, Italy

[21] Appl. No.: 568,352

[22] Filed: Dec. 6, 1995

[30] Foreign Application Priority Data

| Jan. 19, 1989 | [WO] | WIPO | WOA8900761 |
| Dec. 23, 1994 | [IT] | Italy | MI94A2630 |

[51] Int. Cl.⁶ .................................................. H01B 7/00
[52] U.S. Cl. ............................ 174/110 SR; 156/244.12; 427/118; 427/120; 428/383; 525/437; 525/444
[58] Field of Search ................... 156/244.12, 244.13, 156/244.14, 500; 427/117–120; 174/25 R, 25 C, 25 P, 110 SR; 525/437, 444

[56] References Cited

U.S. PATENT DOCUMENTS

| 4,206,011 | 6/1980 | Kanotz et al. ........... 156/498 |
| 5,093,435 | 3/1992 | Harris et al. ............ 525/444 X |
| 5,256,482 | 10/1993 | Yamanouchi et al. ...... 174/110 SR |
| 5,521,009 | 5/1996 | Ishikawa et al. ......... 174/110 SR |

FOREIGN PATENT DOCUMENTS

| WOA8900761 | 1/1989 | WIPO . |
| MI94A2630 | 12/1994 | Italy |

*Primary Examiner*—Michael Lusignan
*Attorney, Agent, or Firm*—Brooks Haidt Haffner & Delahunty

[57] ABSTRACT

A cable, self-extinguishing and releasing low quantities of toxic and corrosive smokes and gases, for optical or electrical applications, comprises a coating (3) including an outer layer (5) consisting of a polymeric mixture including 50 to 80 parts (w/w) of an aromatic polyester of the isophthalic and terephthalic acids, with bisphenol A and 20 to 50 parts (w/w) of a polyether-polyester block elastomer copolymer having a Shore hardness D greater than 50 and a Vicat softening point higher than 170° C., as well as a coaxial inner (4) layer comprising an polyester thermoplastic elastomer including a quantity of aromatic groups such that its Shore hardness D is equal to at least 45 and such that the delamination shear force necessary to separate said layers (4, 5) from one another is equal to at least 2,000 g. after ageing in oil ASTM Nr. 3 for 2 hours at 100° C.

39 Claims, 1 Drawing Sheet

SELF-EXTINGUISHING CABLE RELEASING LOW QUANTITIES OF TOXIC AND CORROSIVE SMOKES AND GASES, AND PROCESS FOR PRODUCING THE SAME

This invention relates to a cable, in particular an electric cable of the so-called low-tension type or an optical cable, self-extinguishing and releasing low quantities of toxic and corrosive smokes and gases.

More particularly, this invention relates to a cable comprising at least a wire and an outer coating, self-extinguishing and releasing low quantities of toxic and corrosive smokes and gases, and having a percent elongation at break equal to at least 100, which coating includes a couple of coaxial layers, respectively inner and outer, the outer layer comprising a polymer mixture including 50 to 80 parts (w/w) of an aromatic polyester of the isophthalic and terephthalic acids with bisphenol A, and 20 to 50 parts (w/w) of a polyether-ester block elastomer polymer having a Shore hardness D greater than 5 and a Vicar softening point higher than 170° C.

As is known, for a number of different cables types and in particular for thin wall low-tension cables to be used in closed environments, in public installations and services, such as for instance rolling stock for railways, subways, trolley-bus and the like, it is necessary, on the one hand, to impart to the cable a number of geometric and mechanical characteristics as well as a suitable resistance to external agents (heat, oils), which allow an easy installation and assure good performances and a long working life thereof, and on the other hand, to assure that the cable as a whole releases low quantities of smokes and does not emanates toxic and corrosive gases should a fire take place.

The problem of simultaneously achieving all these characteristics, in itself difficult to be solved, becomes still more complicated in case of the so-called thin wall cables, i.e. cables in which the thickness of the insulating layer is smaller (generally from 23% to about 27% less) than that traditionally used in cables.

In order to satisfy these requirements, recourse has been had for a long time to plastic materials, capable of providing the cable with the desired geometric and mechanical characteristics, incorporating suitable flame retardant agents, generally based on halogenated compounds, so as to reach the demanded resistance against fire propagation.

However, the above-identified flame retardant agents, while causing the cable to be substantially self-extinguishing, develop in case of fire toxic and corrosive gases, whose presence in the smokes is no longer tolerated by the latest standards.

In order to overcome this drawback, it has been suggested to cover the wire with one or more thermoplastic polymers not including any halogenated flame retardant agent, and at the same time able to provide the cable with the desired geometric and mechanical characteristics.

So, for instance, in Italian patent application Nr. MI 91A002898 of the same Applicant, a cable is described which includes a monolayer coating essentially comprising a polymer mixture including 50 to 80 parts (w/w) of an aromatic polyester of the isophthalic and terephthalic acids with bisphenol A, and 20 to 50 parts (w/w) of a polyether-ester block elastomer copolymer having a Shore hardness D greater than 50 and a Vicat softening point higher than 170° C.

The above cable, while complying with the required geometric and mechanical characteristics, shows however a too high smoke release, which is in turn incompatible with the standards that are presently in force.

Monolayer coatings based on silicone-etherimide proposed as alternatives, show on the contrary a low smoke release, but a poor abrasion resistance.

In order to solve the problem, attempts have been made to combine the geometric, mechanical and fire resistance characteristics of several polymeric materials, using multilayer coatings.

So, for instance, it has been tried to obtain cables having suitable characteristics by combining together a first polypropylene layer and a second layer made up by the second polymeric mixture described in the above-identified Italian patent application or, alternatively, a first layer of cross-linked polyethylene (XLPE) and a second layer of polyetherketone (PEEK).

However, in all the multilayer coatings of the known art, the resulting cable has shown unacceptable mechanical characteristics, because of the insufficient adherence between the layers.

The technical problem at the base of this invention is therefore that of providing a cable, in particular a cable of the so-called thin wall type, showing geometric and mechanical characteristics which allow an easy installation and assure good performances and a long working life thereof, as well as characteristics of low release of non toxic and non corrosive smokes in case of fire.

This problem is solved, according to the invention, by a multilayer cable of the aforementioned type, characterized in that the inner layer of the coating comprises a polyester thermoplastic elastomer, including a number of aromatic groups such that the Shore hardness D of the cable is equal to at least 45 and that the delamination shear force necessary to separate the inner and the outer layers of the coating from one another is equal to at least 2,000 g. after ageing in oil ASTM Nr. 3 for 2 hours at 100° C.

According to the invention, in fact, it has been observed that by coupling in the coating of the wire an outer layer based on the aforementioned polymeric mixture and an inner layer based on an polyester thermoplastic elastomer in which the quantity of the aromatic groups is such as to render its Shore hardness D equal to at least 45, the resulting cable has the required geometric and mechanical characteristics, as well as the characteristic of low release of non toxic and non corrosive smokes, without showing the drawbacks associated to the poor adherence between the layers which make up the coating.

Actually, tests have shown that the aforementioned minimum quantity of aromatic groups is such that it renders the delamination shear force necessary to separate the outer layer from the inner layer at least equal to 2,000 g. after a period of ageing in oil ASTM Nr. 3 for 2 hours at 100° C., which assures a good adhesion between the coating layers.

It also appeared from the tests that the above-identified minimum value of delamination force indicates a sufficient adhesion between the coating layers, independently, at least by way of first estimation, of the cable outer diameter and of the coating thickness. Alkylene terephtalate groups proved to be particularly effective aromatic groups in imparting the above characteristics to the cable. In the following description and in the subsequent claims, the term: alkylene terephtalate group, indicates a group having the following structural formula:

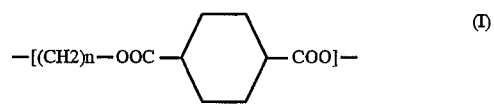

wherein n is an integer comprised between 2 and 8.

The polyalkylene group —(CH$_2$)$_n$— is preferably an aliphatic or cycloaliphatic group, having either a linear or a branched structure. The polyalkylene group —(CH$_2$)n— has preferably a linear structure with n equal to four.

As will appear more clearly in the following, the term: delamination shear force, is used to indicate the force necessary to cause the delamination of the two coating layers, as measured in the standard conditions reported in the SE86-204 specification issued by the BN Division of Bombardier Eurorail, Brugges, Belgium.

Preferably, the polyester thermoplastic elastomer forming the inner layer of the coating is selected from the group comprising: polyether-ester block elastomer copolymers, polybutylene terephthalate, polybutylene terephthalate-polycarbonate polymeric blends, and mixtures thereof.

Particularly preferred, for the purposes of this invention, are the polyether-ester block elastomer copolymers, comprising segments consisting of ethylene terephthalate or tetramethylene terephthalate units and segments of a chain of poly(alkylen-ether)-glycols whose ends are esterified with phthalic acid.

Among them, particularly suitable proved to be the copolymers obtained by transesterification of dimethyl terephthalate with a mixture comprising butane-1,4-diol and at least a polyether comprising hydroxyl terminal groups wherein said polyether is polytetramethylene ether glycol having a molecular weight of from 600 to 3000.

The resulting copolymers have in particular a melting point of from 160° C. to 220° C. and a Melt Flow Rate, measured according to ASTM D1238 at a temperature about 20° C. higher than the melting point of the polymer and with a load of 2.16 kg, higher than 5.

Block elastomer copolymers of preferred use are available respectively under the trade names Hytrel™ 8238 and Hytrel™ 5555 HS (E.I. Du Pont de Nemours).

Among the thermoplastic polyesters of this invention, particularly suitable are either polybutylene terephthalate having a melting point of from 220° C. to 230° C., or polybutylene terephthalate-polycarbonate mixtures or blends comprising up to 20% by weight of polycarbonate, wherein a partial transesterification has taken place between the two polymers, prepared starting from commercially available polybutylene terephthalate and polycarbonate by mixing the two polymers in the molten state.

Polybutylene terephthalate and polybutylene terephthalate-polycarbonate blends of preferred use are available respectively under the trade names Vestodur™ 3000 and Vestodur™ X7190 (Hüls KG).

According to this invention, a second layer comprising a polymeric mixture according to the copending Italian patent application Nr. MI91A002898, comprising 50 to 80 parts (w/w) of an aromatic ester of the isophthalic and terephthalic acids with bisphenol A and 20 to 50 parts (w/w) of a polyether-ester block elastomer copolymer having a Shore hardness D greater than 50 and a Vicat softening point higher than 170° C., is associated to said inner layer.

Preferably, the aromatic polyester of the mixture forming the outer layer is obtained by polycondensation of bisphenol A with a substantially equimolar mixture of isophthalic and terephthalic acids or reactive derivatives thereof.

A substantially non-elastomeric amorphous polyarylate of preferred use, is available under the trade name Ardel™ 100 (Amoco Performance Products, Inc.).

On the other hand, an elastomer block copolymer of preferred use in said mixture is the copolymer available under the trade name Hytrel™ 5555 HS (E.I. Du Pont De Nemours).

In order to improve the stress cracking resistance of the cable, the mixture forming the outer layer of the coating further comprises 15 to 70% (w/w) on the global quantity of polymers, of an agent imparting stress cracking resistance, preferably a silicone-etherimide copolymer.

A silicone-etherimide copolymer of preferred use in said mixture is in particular the copolymer available under the trade name Siltem™ STM 1500 (General Electric Plastics).

According to a further aspect of the invention, a process is also provided for producing a cable, in particular a low-voltage thin wall cable for rolling stock for railways, subways, trolley-bus and the like, of the type comprising a wire and an outer multilayer coating, which process is characterized in that it comprises the following steps:

forming on said wire a first layer having a prefixed thickness from a polyester thermoplastic elastomer selected from the group comprising: polyether-ester block elastomer copolymers, polybutylene terephthalate, polybutylene terephthalate-polycarbonate polymeric blends, and mixtures thereof;

forming on said first layer at least a second layer of a polymeric mixture including 50 to 80 parts (w/w) of an aromatic polyester of the isophthalic and terephthalic acids with bisphenol A and 20 to 50 parts (w/w) of a polyether-ester block elastomer copolymer having a Shore hardness D greater that 50 and a Vicat softening point higher than 170° C.; said forming step of the second layer being carried out while keeping said first layer at a temperature of from 150° C. to 200° C.

According to the invention, it has been found that in order to obtain the required mechanical characteristics of the cable as a whole, and in particular a value of the elongation at break greater than 100, an adequate abrasion resistance, as well as optimum adhesion characteristics between the layers that make up its coating, the temperature of the first layer of polymeric material formed on the wire (inner layer) should be kept within the aforementioned range before forming the second polymeric layer thereon.

Although the reasons of this phenomenon have not been thoroughly studied, during the experiments carried out by the Applicant, it has been observed that when the temperature of the inner layer falls beneath said values, the characteristics of abrasion resistance, elongation at break of the cables and the adhesion characteristics of the layers decline to an unacceptable extent.

According to a preferred embodiment, the cable may be continuously obtained by carrying out said forming steps by extrusion in apparatuses known per se.

Advantageously, the coating may be formed on the wire by coextrusion or, alternatively, by tandem extrusion—i.e. by using two extruders in series—of the thermoplastic polyester and of the polymeric mixture constituting respectively the inner and outer layers.

According to a further aspect of the invention, the two layers of the cable coating may also be formed at different times, for instance at a time interval of some hours or even some days.

In this case, the extrusion step of the second polymeric layer shall be carried out after pre-heating the layer already formed on the wire, in order to raise the temperature thereof to the required value. It has also been observed during the tests that it is preferable to carry out, besides the above-identified pre-extrusion heating of the inner layer, a drying step so as to reduce the humidity absorbed by the already extruded polymer down to a value not greater than 300–500 ppm, according to the type of polymer used.

So, for instance, the humidity value of the inner layer may be brought under 500 ppm in the case of the elastomer block copolymer Hytrel™ 5555, while it has to be further reduced down to about 300 ppm in the case of the polybutylene terephthalate Vestodur™ 3000.

When the humidity of the first layer exceeds the above minimum value, in fact, bubbles were observed which substantially and unacceptably alterate the geometric and mechanical characteristics of the finished cable.

The pre-extrusion heating step of the first polymeric layer may take place in any way known in the art, for instance by means of a conventional hot air heater.

BRIEF DESCRIPTION OF THE DRAWING

Further advantages and characteristics of this invention will become more readily apparent from the following description of some embodiments thereof, given by way of non-limiting illustration with reference to the attached drawing figure 1 which shows, in perspective view and partial section, a cable according to the invention.

DETAILED DESCRIPTION

Figure 1:
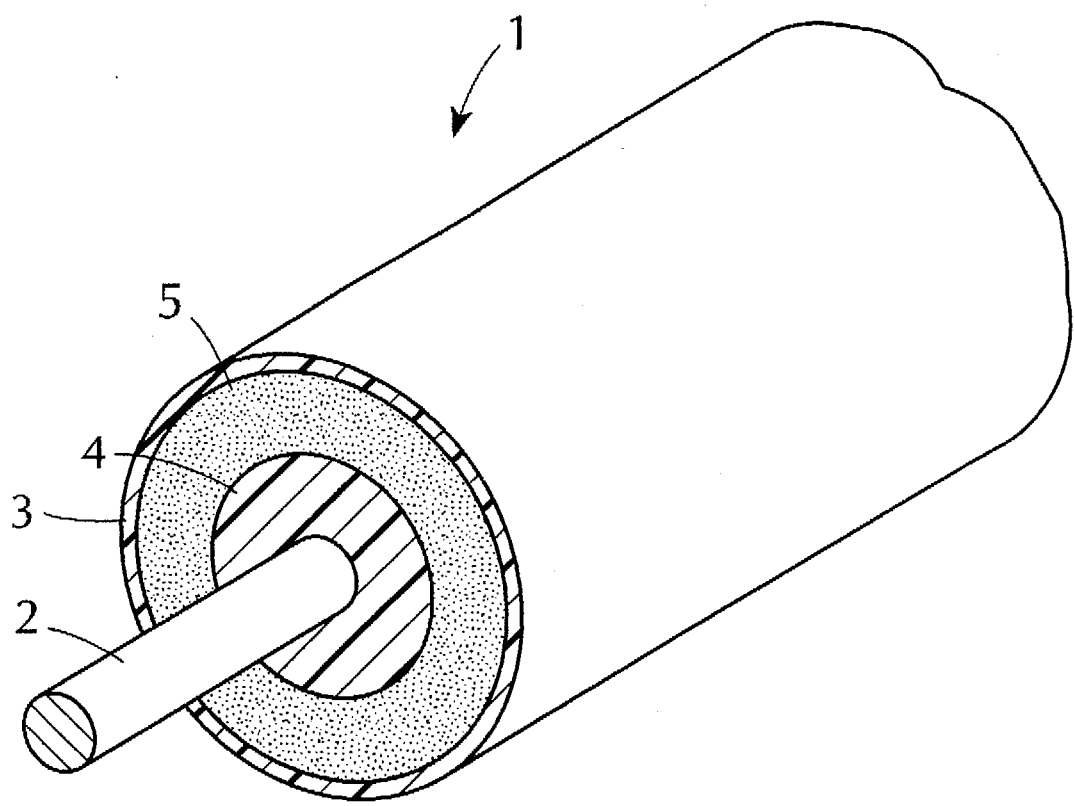

In said figure, 1 indicates a cable comprising a wire 2 and a coating 3, including in turn two coaxial layers 4, 5, respectively inner and outer.

When the cable 1 is an electric cable, 2 is an electric wire or electrical energy conductor and 3 is the cable insulation.

When, on the contrary, 1 is an optical cable, 2 is an optical wire or light energy conductor comprising at least an optical fiber and 3 is the cable sheath.

EXAMPLE 1

According to the invention, a cable 1, in particular a thin wall electric cable, was produced using as a wire 2 a 19×0.25 mm wire cords having a cross section of 0.93 mm2.

The inner layer 4 of coating 3 was formed by extrusion on such wire, employing thermoplastic polyester Hytrel™ 8238 (E.I. Du Pont de Nemours) having a Shore hardness D of 82.

The thermoplastic polyester used was vacuum-dried at 110° C. for 16 hours before the extrusion.

The extrusion step was carried out by means of a conventional extruder having an inner diameter of 45 mm, provided with a transfer thread screw, equipped with a mandrel with a diameter of 1.79/2.80 mm and a die of a diameter equal to 3.60 mm.

The DDR stretching ratio during the extrusion operations was equal to about 11.

The temperature profile observed in the extruder from the feed zone to the head changed from about 190° C. to about 235° C., with a screw rotation speed of 1.2rpm, and a line speed of 11 m/min.

In this way, a wire 2 covered by a layer 4, uniform and homogeneous and having a thickness of 0.125 mm, was obtained.

After about 1 hour, the outer layer 5 was formed by extrusion on the inner layer 4, using a polymeric mixture obtained by mixing 65 parts of a polyarylate (Ardel™ D-100 produced by Amoco) with 25 parts of a polyether-ester block copolymer (Hytrel™ 5555-HS produced by Du Pont) and 10 parts of a silicone-etherimide (Siltem™ STM 1500 produced by General Electric Plastics) in a conventional twin-screw mixer.

The extrusion step of the outer layer 5, carried out by means of the aforementioned extruder and dies, was preceded by a step of careful heating of layer 4, so as to raise the temperature thereof up to about 170° C.

The extrusion of layer 5 took place in the same way, except for the temperature profile, which changed from 240° C. to 280° C., and for the DDR ratio, which in this case was equal to about 6.

In this way, a layer 5 was obtained, uniform and homogeneous, having a thickness of 0.125 mm, such as to increase the whole diameter of the cable up to about 1.70 mm.

EXAMPLES 2–3

Just in the same way as described in the preceding example 1, structurallly identical cables 1 were prepared, using however other thermoplastic polyesters according to the invention in the inner layer 4 of coating 3.

More particularly, a polybutylene terephthalate-polycarbonate blend and polybutylene terphthalate, sold under the trade names Vestodur™ X7190 and Vestodur™ 3000 (Hüls) respectively, were employed. During the extrusion step of the inner layer, the temperature profile changed in both cases from 235° C. to 265° C., while the screwturns and the line speed were equal to about 1.4 rpm and 30 m/min respectively.

The layer 4 thus obtained, were pre-heated at about 170°–180° C. before extrusion of the outer layer 5, which was carried out in the same way as described in Example 1.

EXAMPLES 4–6

(Comparison)

According to the preparation method of the preceding Example 1, a set of reference cables was produced employing polymeric materials of different types in the inner layer 4 of coating 3.

More particularly, use was made of the following materials:

- a polyether-ester block copolymer having a Shore hardness D lower than 45 and a melting point of 148° C. (Hytrel™ 4056 produced by Du Pont) (Ex. 4);
- an ethylene (68% w/w), alkylacrylate (25% w/w) and glycidyl methacrylate (7% w/w) terpolymer (Lotsder™ AX8900 produced by ELF Atochem) (Ex. 5);
- a 6,12 polyamide (Zytel™ 158 produced by Du Pont) (Ex. 6).

Out of such materials, only Zytel™ 158 of Example 6 was submitted to drying before extrusion.

Extrusion parameters other than those of Example 1 are shown in Table I hereunder.

TABLE I

| Example | T (°C.) | Screwturns* | Line speed** |
| --- | --- | --- | --- |
| 4 | 150–195 | 1.2 | 14 |
| 5 | 110–170 | 1.1 | 7 |
| 6 | 230–270 | 1.0 | 26 |

\* = rpm
\*\* = m/min

The layers 4 obtained in this way were pre-heated at about 170° C. before extrusion of the outer layer 5, which took place according to the same method of Example 1.

In the case of Example 5, it was not possible to obtain a uniform and controllable thickness of the inner layer.; the subsequent extrusion of layer 5 increased in fact the cable diameter from about 1.70 mm to 1.80 mm.

In the following examples, the cables obtained according to the preceding Examples 1–6 were submitted to comparative tests in order to evaluate the mechanical characteristics, fire resistance, smoke corrosivity and toxicity, as well as the resistance against delamination of the layers forming the wire coating.

EXAMPLE 7

(Mechanical characteristics)

The properties of tensile strength at break (CR) and elongation at break (AB) of the cables were evaluated according to French standards NF F 63-808 paragraphs 5.2.E.4 and 11.2.3. The results are shown in Table II hereunder (mean values of 5 measurements).

TABLE II

| Example | CR (MPa) | AR (%) |
|---|---|---|
| 1 | 41,4 | 107 |
| 2 | 46 | 105 |
| 3 | 44 | 115 |
| 4 | 23.4 | 120 |
| 5 | n.e. | n.e. |
| 6 | 42.7 | 60 | n.e.: not evaluable because of the excessive adhesion of the inner layer to the wire.

The data of Table II show that:

AR values are acceptable fop the cables of Examples 1, 2, 3, 4;

CR values are acceptable fop the cables of Examples 1, 2, 3, 6. Considering the data as a whole, it emerges that either the cable of Example 4 and the cable of Example 6 do not provide adequate mechanical characteristics, as the CR is lower than the minimum value of 30 MPa usually accepted for most applications and, respectively, the percent AR is lower than 100.

EXAMPLE 8

(Abrasion resistance)

The abrasion resistance properties of the cables were evaluated according to French standards NF F 64-808 paragraphs 5.5.2.5. and 11.4.2.5.

The results are shown in Table III hereunder.

TABLE III

| Example | No. of cycles | Mean |
|---|---|---|
| 1 | 1264,1149,1519,1560,1206 843,1153,578 | 1159 |
| 2 | 956,1587,989,1091 | 1155 |
| 3 | 1116,1184,1490,982 | 1193 |
| 4 | 99,149,43,111 | 100 |
| 5 | 726,990,96,85 | 474 |
| 6 | 647,479,920,1012 | 764 |

Since according to the above standards the minimum number of cycles admitted is equal to 100 and the minimum mean value admitted is equal to 150, the data of Table III show that all the cables pass the test, except for the cables of Examples 4 and 5.

In this connection, it is believed that the insufficient abrasion resistance of these cables is to be attributed to a poor resistance of the polymers that make up the first layer, and to the poor adherence of the outer layer which, being loose, has a furtherly reduced abrasion resistance.

With the cable of Example 5 the formation of permanent plies on the outer layer was also observed when it was bent on a mandrel whose diameter was four times the diameter of the cable.

In this connection, it must be stressed that the formation of such plies would make the installation of the cable very difficult.

EXAMPLE 9

(Resistance against notch propagation)

The properties of resistance against notch propagation of the cables were evaluated according to French standards NF F 63-808 paragraphs 5.5.2.4. and 11.4.2.4. All of the examined cables passed the tests.

EXAMPLE 10

(Flame behaviour)

The flame resistance properties of the cables were evaluated acording to the standards IEC 332-1.

The tests performed showed that the cables of the present invention pass the test even if their coating does not include flame-retardant additives, such as, for instance, halogenated compositions.

EXAMPLE 11

(Smoke behaviour)

The evaluation of the physico-chemical properties and of the toxicity characteristics of the smokes produced by the cables was carried out according to French standards NF F 63-808 paragraphs 5.5.4.7 and 11.4.4.9.

More particularly, said standards provide for the so-called smoke index (I.F.)—as defined by the formula hereunder— to be smaller than 5.

$$I.F.=D_m/100+VOF4/30+I.T.C._{cable}/2$$

wherein:

-Dm=maximum optical smoke density;

-VOF4=clouding after 4 minutes

-I.T.C.cable =conventional toxicity index of the cable. The latter parameter is defined as follows:

$$I.T.C._{cable}=100\times[\Sigma t_i/CC_i]\times m_r/m_t$$

wherein:

-$t_i$=concentration of the gases found in the smokes (mg/g. of coating);

-$CC_i$=critical concentrations of gases (mg/m$^3$);

-$m_r$=linear mass of the cable coating (g/m);

-$m_t$=linear mass of the cable (g/m);

The results of the tests carried out (mean of three tests) are shown in Table V hereunder.

TABLE V

| Example | VOF4/30 + Dm/100 | I.T.C. | I.T.C.$_{cable}$ /2 | I.F. |
|---|---|---|---|---|
| 1 | 3.19 | 6.7 | 0.49 | 3.68 |
| 2 | 3.33 | 6.9 | 0.506 | 3.84 |
| 3 | 3.715 | 6.9 | 0.505 | 4.22 |
| 6 | 4.34 | 19.79 | 1.34 | 5.68 |

During the experiments carried out, it was observed that the cables of the present invention (Examples 1–3) passed the test.

EXAMPLE 12

(Adhesion between the layers of the coating)

The evaluation of the adhesion characteristics between the layers forming the cable coating was carried out according to the specification SE 86-204 of the BN Division of Bombardier Eurorail, Brugge, Belgium.

More particularly, in the case of the cables considered (18 AWG), the above standards provide that the force necessary to separate the layers in standardized conditions on the original cable and after a period of ageing in oil ASTM Nr. 3 for 2 hours at 100° C. should be greater than 3,500 g. The tests were carried out as follows.

From a lot of 6 test samples having a length equal to 80±3 mm cut out from each of the cables obtained, 3 test samples were chosen and subsequently immersed in oil ASTM Nr. 3 for 2 hours at 100° C.

The outer layer 5 of coating 3 of each of the six test samples was then removed with a blade for a total length of 30 mm, taking care not to damage nor cut the inner layer 4.

The test was carried out by means of an apparatus for the measurement of the tensile force wherein the upper traction clamp of the test sample was provided with an L-bent arm, in which arm a hole had been obtained whose diameter was equal to the diameter of the cable without the outer layer 5.

In this way, it was possible to introduce in the hole only the portion of each test sample without the outer layer 5 of the coating, whose free end was thereafter clasped by the lower clamp of the measurement apparatus.

The delamination resistance was then determined by measuring the force capable of causing a sliding of the two layers of the coating relatively to one another as the two clamps were gradually drawn away from one another.

The results of the tests performed, in terms of delamination force (in grams, mean of three tests) are shown in Table VI hereunder.

TABLE VI

| Example | as such | after ageing | Notes |
|---------|---------|--------------|-------|
| 1 | n.p. | n.p. | * |
| 2 | n.p. | n.p. | * |
| 3 | n.p. | n.p. | * |
| 4 | n.p. | 1767 | |
| 5 | n.p. | >10,000 | |
| 6 | 6000 | about 500 | ** | n.p. = not performable, i.e. the adhesion between the two layers did not allow to uncover the first layer in order to perform the test in standard conditions.
* = it was impossible to separate the layers even after ageing;
** = easy delamination upon ageing.

The tests carried out proved that the cables of the present invention (Examples 1–3) and the cable of Example 5 passed the test.

As to the cables of Examples 4 and 6, for which it was possible to separate upon oil ageing the two layers 4 and 5, the delamination shear force was lower than 2,000 g.

As to the cable of Example 5, which in itself was able to pass the delamination test, it should be noticed that it showed unacceptable characteristics as concerns abrasion resistance, the impossibility of pulling the wire out of the coating, the formation of permanent plies. Besides, the production of such cable is extremely critical because of the difficulty of extruding thin layers such as those of thin wall cables.

EXAMPLE 13

(Influence of extrusion conditions)

In order to evaluate the influence of the pre-heating temperature of the inner layer of coating 3 on the main characteristics of the cable (CR, AR, delamination resistance, abrasion resistance), a cable was prepared according to the same method of Example 1, except that layer 4 was pre-heated at a temperature of about 130° C.

The tensile strength at break (CR) and elongation at break (AR) of the cable were evaluated according to French standards NF F 63-808 paragraphs 5.2.E.4 and 11.2.3., while the characteristics of abrasion resistance and adhesion were determined according to the tests described for the preceding Examples 8 and 12.

The results are shown in Table VII hereunder (mean value of 5 measurements).

TABLE VII

| Characteristic | Ex 1 | Ex. 16 |
|---------------|------|--------|
| CR (MPa) | 41.4 | 35.1 |
| AR (%) | 107 | 93* |
| Delamin. shear F.(kg) | n.p. | 2.2 - 4.5 - 3.3 - 3.3 |
| Abrasion resistance | 1264-1149-1519 1560-1206-843 1153-578 | 322-305-139-54 429-245-192-110 | n.p. = not performable
* = this value refers to the fracture of the outer layer; actually, the outer layer broke first, then the inner layer after a further elongation of same.

The data of the table show that an inadequate heating of the inner layer brings about a lower adhesion of the two layers, as was stressed by the marked reduction in the delamination resistance, which affects in turn both the mechanical characteristics and the abrasion resistance of the cable.

According to the present invention it was found that a cable coating complying with the desired needs can be provided by forming said coating in two layers, using materials having special properties and according to the indications given hereinabove, provided that said materials and their treatment are so chosen as to assure an adequate adhesion between the two layers, to prevent delamination.

In particular, for a cable with a two layer coating in which the outer layer is formed by a mixture of aromatic polyester and polyether-ester copolymer, it is herein provided to use—as inner layer material—an polyester thermoplastic elastomer in which the number of its aromatic groups, as well as the application treatment of same, are so chosen so as to obtain a prefixed hardness and a sufficient value of delamination resistance between the layers.

The present invention, therefore, relates according to one aspect, to a cable in which the forming operations of the layers were carried out so as to obtain a sufficient value of delamination resistance, in particular by controlling the temperature of the inner layer during the forming step of the outer layer.

This is carried out, for instance, by co-extruding the inner and outer layers, or by keeping them at a given temperature or, optionally, by heating said already extruded inner layer prior to the extrusion of the outer layer thereon.

From what has been described and illustrated above, it is plainly evident that the cable of the invention shows all the characteristics that make it useable in public installations and services, and in particular in rolling stock.

Thanks to the excellent adhesion between the coating layers, the cable of the invention can be installed without special problems of ply formation or, worse, of abrasion of the coating.

The achievement of these characteristics is still more remarkable if one takes into account the fact that—in a preferred embodiment—the cables of this invention are of the so-called thin wall type, i.e. having a minimum thickness of their coating.

Clearly, a skilled man in the art may introduce changes and variants to the invention described hereinabove in order to satisfy specific and contingent application requirements, which changes and variants fall anyhow within the scope of protection as defined by the following claims.

I claim:

1. Cable comprising at least an energy conductor (2) and an outer coating (3), self-extinguishing, releasing low quantities of toxic and corrosive smokes and gases, and having a per cent elongation at break equal to at least 100, which coating includes a couple of coaxial layers, respectively inner (4) and outer (5), said outer layer (5) comprising a polymeric mixture including 50 to 80 parts (w/w) of an aromatic polyester of the isophthalic and terephthalic acids, with bisphenol A and 20 to 50 parts (w/w) of a polyether-polyester block elastomer copolymer having a Shore hardness D greater than 50 and a Vicat softening point higher than 170° C., characterized in that said inner layer (4) comprises a polyester thermoplastic elastomer including a quantity of aromatic groups such that its Shore hardness D is equal to at least 45 and such that the delamination shear force necessary to separate said layers (4, 5) from one another is equal to at least 2,000 g after ageing in oil ASTM Nr. 3 for 2 hours at 100° C.

2. Cable according to claim 1, characterized in that said aromatic groups are alkylene terephthalate groups in which the polyalkylene group is a linear or branched aliphatic or cycloaliphatic group, comprising from 2 to 8 carbon atoms.

3. Cable according to claim 1, characterized in that said thermoplastic polyester is selected from the group comprising: polyether-ester block elastomer copolymers, polybutylene therephthalate, polybutylene terephthalate-polycarbonate polymeric blends, and mixtures thereof.

4. Cable according to claim 3, characterized in that said polyether-ester block elastomer copolymers are obtained by transesterification of dimethyl therephthalate with a mixture including butane-1,4-diol and at least a polyether including terminal hydroxyl groups.

5. Cable according to claim 4, characterized in that said at least one polyether is polytetrametylene ether glycol having a molecular weight of from 600 to 3000.

6. Cable according to claim 3, characterized in that said polyether-ester block elastomer copolymers have a melting point of from 160° C. to 220° C.

7. Cable according to claim 3, characterized in that said polybutylene terephthalate has a melting point of from 220° C. to 230° C.

8. Cable according to claim 3, wherein said poliether-ester block elastomer copolymer is Hytrel™ 8238 HS or Hytrel™ 5555.

9. Cable according to claim 3, wherein said polybutylene terephthalate is constituted by Vestodur™ 3000.

10. Cable according to claim 3, characterized in that said polybutylene terephthalate-policarbonate blends comprise up to 20% by weight of polycarbonate.

11. Cable according to claim 3, wherein said polybutylene terephthalate-polycarbonate blend is Vestodur™ X7190.

12. Cable according to claim 1, characterized in that the aromatic polyester of the mixture forming the outer layer (5) of coating (3) is obtained by polycondensation of bisphenol A with a substantially equimolar mixture of isophthalic and terephthalic acid or a mixture of reactive derivatives thereof.

13. Cable according to claim 12, wherein the aromatic polyester is Ardel™ 100.

14. Cable according to claim 1, wherein the poliether-ester block elastomer copolymer is Hytrel™ 5555 HS.

15. Cable according to claim 1, characterized in that the mixture forming the outer layer (5) of coating (3) further comprises 15 to 70% (w/w), on the total amount of polymers, of at least one agent imparting resistance against stress cracking.

16. Cable according to claim 15, characterized in that said at least one agent imparting resistance against stress cracking is a silicone-etherimide copolymer.

17. Cable according to claim 16, characterized in that the silicone-etherimide copolymer is Siltem™ STM 1500.

18. Cable according to claim 1, wherein said conductor is an electric wire.

19. Cable according to claim 1, wherein said conductor is an optical fiber and said coating is the cable sheath.

20. Process for producing a cable of the type comprising a wire (2) and an outer multilayer coating (3), characterized in that it comprises the following steps:

forming on said wire (2) a first layer (4) having a prefixed thickness of a polyester thermoplastic elastomer selected from the group comprising: polyether-ester block elastomer copolymers, polybutylene terephthalate, polybutylene terephthalate-polycarbonate polymeric blends, and mixtures thereof;

forming on said first layer (4) at least a second layer (5) of a polymeric mixture including 50 to 80 parts (w/w) of an aromatic polyester of the isophthalic and terephthalic acids with bisphenol A and 20 to 50 parts (w/w) of a polyether-ester block elastomer copolymer having a Shore hardness D greater that 50 and a Vicat softening point higher than 170° C.; said forming step of the second layer (5) being carried out while keeping said first layer (4) at a temperature of from 150° C. to 200° C.

21. Process according to claim 20, characterized in that said forming steps are carried out by extrusion.

22. Process according to claim 21, characterized in that said first (4) and said second (5) layers are formed on said wire (2) by coextrusion of said thermoplastic polyester and said polymeric mixture.

23. Insulating compositions for coating cables which, when applied in two coaxial layers, are self-extinguishing, releasing low quantities of toxic and corrosive smokes and gases, and having a percent elongation at break equal to at least 100, one of said compositions comprising a polymeric mixture including 50 to 80 parts (w/w) of an aromatic polyester of the isophthalic and terephthalic acids with bisphenol A and 20 to 50 parts (w/w) of a polyether-ester block elastomer copolymer having a Shore hardness D greater than 50 and a Vicat softening point higher than 170° C., and the other of said compositions being for an inner layer and comprising a polyester thermoplastic elastomer including a quantity of aromatic groups such that its Shore hardness D is equal to at least 45 and such that the delamination shear force necessary to separate the two layers from one another is equal to at least 2,000 g after in oil ASTM Nr.3 for 2 hours at 100° C.

24. The insulating compositions according to claim 23, characterized in that said aromatic groups are alkylene terephthalate groups wherein the polyalkylene group is a linear or branched aliphatic or cycloaliphatic group comprising 2 to 8 carbon atoms.

25. The insulating compositions according to claim 23, characterized in that said thermoplastic polyester is selected from the group comprising: polyether-ester block elastomer copolymers, polybutylene terephthalate, polybutylene terephthalate-polycarbonate polymeric blends, and mixtures thereof.

26. The insulating compositions to claim 25, characterized in that said polyether-ester block elastomer copolymers are obtained by transesterification of dimethyl terephthalate with a mixture including butane-1,4-diol and at least a polyether including terminal hydroxyl groups.

27. The insulating compositions according to claim 26, characterized in that said at least one polyether is polytetramethylene ether glycol having a molecular weight of from 600 to 3000.

28. The insulating compositions according to claim 25, characterized in that said polyether-ester block elastomer copolymers have a melting point of from 160° C. to 220° C.

29. The insulating compositions according to claim 25, characterized in that said polybutylene terephthalate has a melting point of from 220° C. to 230° C.

30. The insulating compositions according to claim 25, wherein said polyether-ester block elastomer copolymer is Hytrel™ 8238 or Hytrel™ 5555 HS.

31. The insulating compositions according to claim 25, wherein said polybutylene terephthalate is Vestodur™ TM 3000.

32. The insulating compositions according to claim 25, characterized in that said polybutylene terephthalate-polycarbonate polymeric blends comprise up to 20% by weight of polycarbonate.

33. The insulating compositions according to claim 25, wherein said polybutylene terephthalate-polycarbonate polymeric blend is Vestodur™ X7190.

34. The insulating compositions according to claim 23, characterized in that the aromatic polyester of an mixture forming the outer layer is obtained by polycondensation of bisphenol A with a substantially equimolar mixture of isophthalic and terephthalic acids or a mixture of reactive derivatives thereof.

35. The insulating compositions according to claim 34, wherein the aromatic polyester is Ardel™ 100.

36. The insulating compositions according to claim 23, wherein the polyether-ester block elastomer copolymer of said mixture is Hytrel™ 5555 HS.

37. The insulating compositions according to claim 23, characterized in that the mixture forming an outer layer further comprises 15 to 70% (w/w), on the total amount of polymers, of at least one agent imparting resistance against stress cracking.

38. The insulating compositions according to claim 37, characterized in that said at least one agent imparting resistance resistance against stress cracking is a silicone-etherimide copolymer.

39. The insulating compositions according to claim 38, characterized in that the silicone-etherimide copolymer is Siltem™ STM 1500.

* * * * *

UNITED STATES PATENT AND TRADEMARK OFFICE
CERTIFICATE OF CORRECTION

PATENT NO. : 5,644,105
DATED : July 1, 1997
INVENTOR(S) : Castellani

It is certified that error appears in the above-indentified patent and that said Letters Patent is hereby corrected as shown below:

Column 6, line 41, change "Lotsder" to --Lotader--;

Column 7, line 26, change "fop" to --for--;

Column 7, line 28, change "fop" to --for--;

Column 12, line 61, after "after" and before "in" insert --aging--.

Column 13, line 25, cancel "TM" (second occurrence);

Signed and Sealed this

Seventeenth Day of February, 1998

*Attest:*

BRUCE LEHMAN

*Attesting Officer*   *Commissioner of Patents and Trademarks*